United States Patent
Bonne

(10) Patent No.: US 6,397,779 B1
(45) Date of Patent: Jun. 4, 2002

(54) FLY-THROUGH BIRD FEEDER WITH AUTOFEEDER

(76) Inventor: John Roy Bonne, PO Box 3599, Tustin, CA (US) 92781

( * ) Notice: Subject to any disclaimer, the term of this patent is extended or adjusted under 35 U.S.C. 154(b) by 0 days.

(21) Appl. No.: 09/615,548

(22) Filed: Jul. 13, 2000

(51) Int. Cl.[7] .................................................. A01K 1/10
(52) U.S. Cl. .................. 119/51.01; 119/52.1; 119/52.2; 119/57.8; 119/57.9; 119/429; 119/51.02
(58) Field of Search .................................. 119/342, 343, 119/346, 51.01, 51.02, 51.03, 51.04, 51.05, 72.5, 722, 168, 432, 428–435, 475, 52.1, 52.5, 55, 57.5, 57.6; 19/57.91, 52.2, 52.3, 57.8, 57.9

(56) References Cited

U.S. PATENT DOCUMENTS

| | | | | |
|---|---|---|---|---|
| 535,020 A | * | 3/1895 | Powell | 119/51.01 |
| 1,662,687 A | * | 3/1928 | Tullis | 119/459 |
| 1,885,359 A | * | 11/1932 | Kroczek | 119/463 |
| 1,916,570 A | * | 7/1933 | Heider | 119/51.01 |
| 2,065,923 A | * | 12/1936 | Jessen | 119/471 |
| 2,944,364 A | * | 7/1960 | Kelly | 119/52.4 |
| 4,029,051 A | * | 6/1977 | McKinney | 119/52.4 |
| 4,104,988 A | * | 8/1978 | Trutor | 119/432 |
| 4,425,873 A | * | 1/1984 | Rinne, Jr. | 119/53 |
| 4,442,793 A | * | 4/1984 | Overpeck et al. | 119/432 |
| 4,753,195 A | * | 6/1988 | Maggio | 119/52.2 |
| 4,838,205 A | * | 6/1989 | Larson | 119/52.2 |
| 4,881,491 A | * | 11/1989 | Brown | 119/51.01 |
| 5,269,255 A | * | 12/1993 | Finn | 119/428 |
| 5,339,767 A | * | 8/1994 | Krag | 119/57.8 |
| 5,771,839 A | * | 6/1998 | Marsh | 119/52.2 |
| 5,823,137 A | * | 10/1998 | Rood et al. | 119/166 |
| 5,921,201 A | * | 7/1999 | Green | 119/429 |
| 5,957,087 A | * | 9/1999 | Bonder et al. | 119/429 |
| 6,209,489 B1 | * | 4/2001 | Akins | 119/52.1 |

* cited by examiner

Primary Examiner—Charles T. Jordan
Assistant Examiner—Stephen Holzen

(57) ABSTRACT

A uniquely designed truncated prism shaped fly-through bird feeder (where birds can fly into and through the bird feeder) described. The bird feeder frame structure has a bottom and moveable roof structure rotatably attached to side support members between the roof and a base. The bird feeder base further includes a movable floor structure rotatably attached to said frame and a birdseed autofeeder structure. The roof can be raised for easy filling of the truncated prism shaped autofeeder mounted to one side of said frame. The autofeeder is rotatably and removably attached to said frame and can be rotated outwards away from said frame for easy emptying and removal and cleaning of transparent sides. The moveable floor can be rotated outwards and upside down for easy emptying and cleaning.

15 Claims, 4 Drawing Sheets

FLY-THROUGH BIRD FEEDER WITH AUTOFEEDER

BACKGROUND OF THE INVENTION

1. Field of the Invention

The field of this invention relates to bird feeders. More particularly this invention relates to fly through bird feeders which permit birds to fly through the bird feeder structure and thereby provide a measure of safety for birds by providing multiple escape routes should a predator attack the birds while feeding.

2. Related Art

For years, bird feeders have been popular with many people including bird watchers, homeowners and others. One popular type of bird feeder is the fly-through or "hopper feeder" typically mounted on a post. The fly-through open design (where birds can fly into and through the bird feeder) attracts birds that prefer an open setting so they can look for predators. The fly-through open design feeder is also an effective setting for viewing birds from various angles since there are few blind spots, which shield the entire bird from viewing.

However, these feeders do not have autofeeder mechanism for storing and supplying larger amounts of seed and therefore fly-through feeders require frequent manual birdseed filling on the floor of the feeder. Feeding birds tend to kick the feed on the floor of the bird feeder about and often out of the feeder entirely. Once the birdseed supply is gone, the birds may permanently leave to find food elsewhere if it is not promptly refilled.

In addition, the floor of the feeder needs to be emptied and cleaned on a regular basis to prevent communicable bird disease from spreading. Fly through feeders typically have a floor mounted in a slideable drawer, which can be removed from the feeder for cleaning. The floor once removed may inadvertently be stepped on or other wise damaged. Since it is exposed to weather, the drawer may become warped over time preventing ease of removal and cleaning.

Therefore, there is a need for a fly-through bird feeder that has an easily filled autofeeder that can automatically supply a large amount of birdseed to maintain a constant bird population and be easily accessible for cleaning. The present invention provides a fly-through bird feeder that has an easily filled autofeeder that can automatically supply a large amount of birdseed to maintain a constant bird population which can be easily accessible for cleaning and prevents the various parts of the feeder from being removed or damaged.

SUMMARY OF THE INVENTION

This invention is for a uniquely designed truncated prism shaped fly-through bird feeder (where birds can fly into and through the bird feeder). The bird feeder of the present invention comprises a lower frame, a supporting frame, and a top frame. The bird feeder further includes a bottom or floor and moveable roof, each of which is rotatably attached to the bird feeder at, said lower frame and said top frame respectively. The bird feeder 1 further includes an autofeeder structure for dispensing birdseed on to the floor. The auto feeder is also rotatably attached to the bird feeder.

The roof can be raised for easy filling of the autofeeder, which is disposed beneath the roof 5 when the roof is closed to protect the contents of the autofeeder from the weather.

The autofeeder is in the form of a truncated prism mounted to one side of said bird feeder can be rotated outwards away from said frame for easy emptying and removal and cleaning of transparent sides. The floor can be rotated outwards and upside down for easy emptying and cleaning.

The object of the invention is to provide a fly-through bird feeder that has an easily filled autofeeder that can automatically supply a large amount of birdseed and be easily accessible for cleaning.

BRIEF DESCRIPTIONS OF THE DRAWINGS

DETAILED DESCRIPTION OF THE INVENTION

Figure 1:
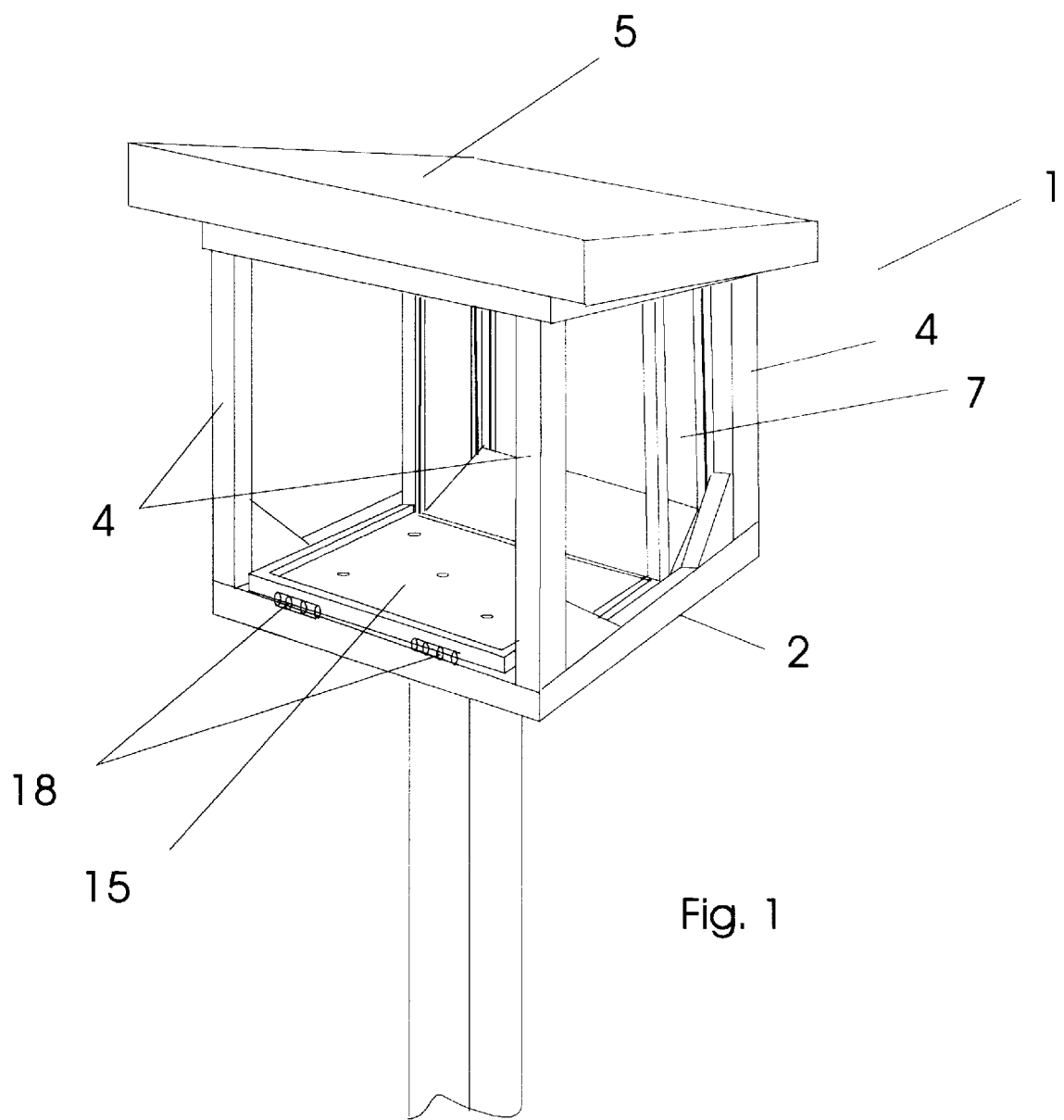
FIG. 1 is a perspective view of the entire birder feeder of the present invention with moveable floor, autofeeder and roof.
Figure 2:
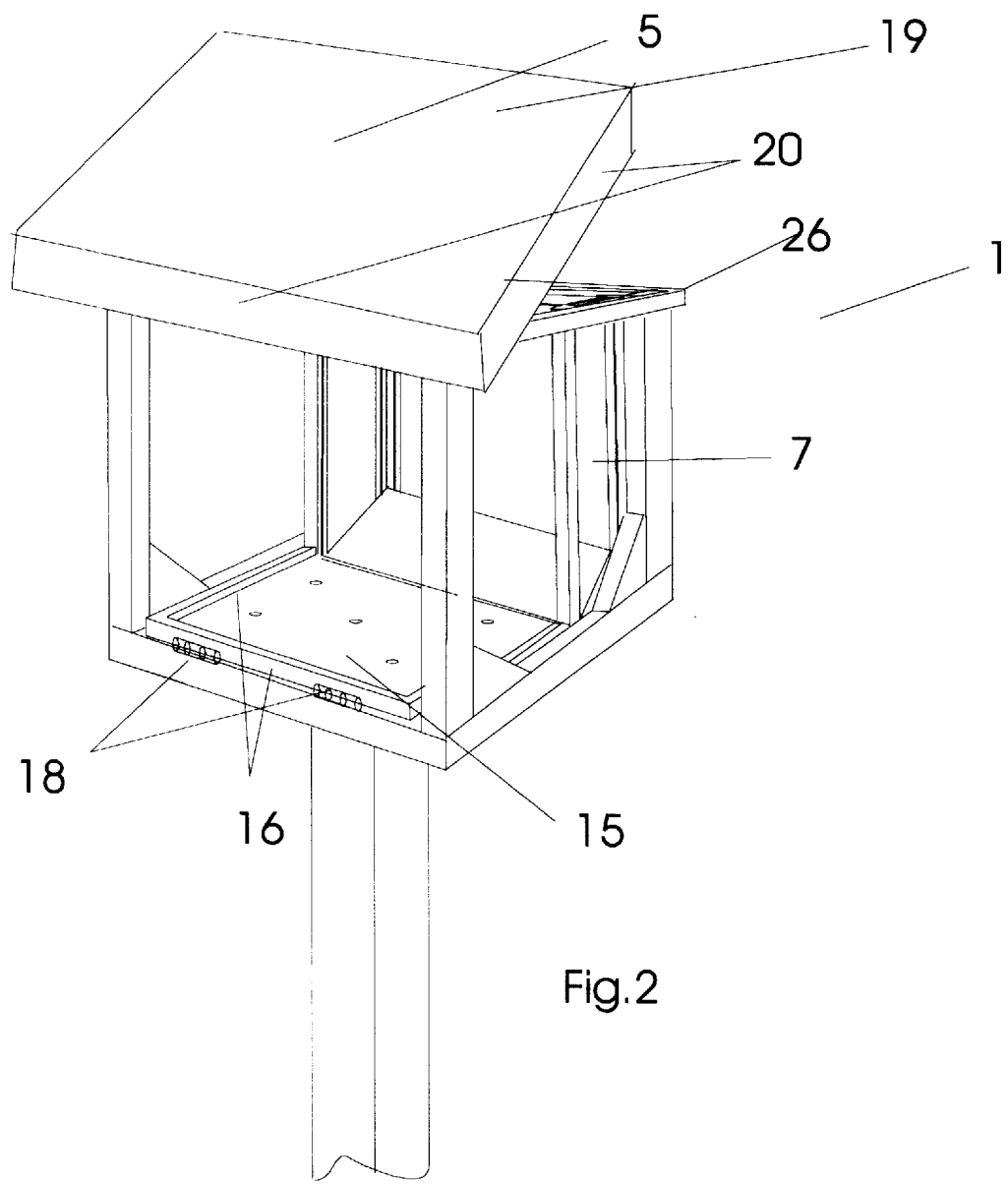
FIG. 2 is a perspective view of the bird feeder of the present invention with the roof raised for easily filling the autofeeder.

With reference to the drawings, FIG. 1 illustrates the bird feeder 1 of the present invention having a lower frame 2, a supporting frame 4, and a top frame 26 as shown in FIG. 2. The bird feeder 1 includes a bottom or floor 15, which may be perforated, and a moveable roof 5 each rotatably attached to said lower base frame 2 and said top frame 26 respectively. FIG. 1 shows the bottom attached to the lower frame 2 by two hinges 18, The roof 5 is attached to top frame 26 by two hinges 22 which are not shown in FIG. 1 but are illustrated in position in FIG. 3. The bird feeder 1 further includes an autofeeder 7 for dispensing birdseed on to the bottom 15. The auto feeder 7 is also rotatably attached to the top frame 26 at the end opposite the attachment of the roof 5 to the top frame 26.

Referring to FIG. 2, the roof 5 is shown in a raised position, which facilitates easy filling of the autofeeder 7, which is disposed in the bird feeder 1 beneath the roof 5. When the roof 5 is closed it covers the bird feeder 1 feeding area on the floor and protects the contents of the autofeeder 7 from the weather. The roof structure is formed by a top 19 and sides 20, which extend below the top thereby creating a cavity, which receives top frame 26. The roof is slanted toward the rear of the feeder and thus permits rainwater run off.

Figure 3:
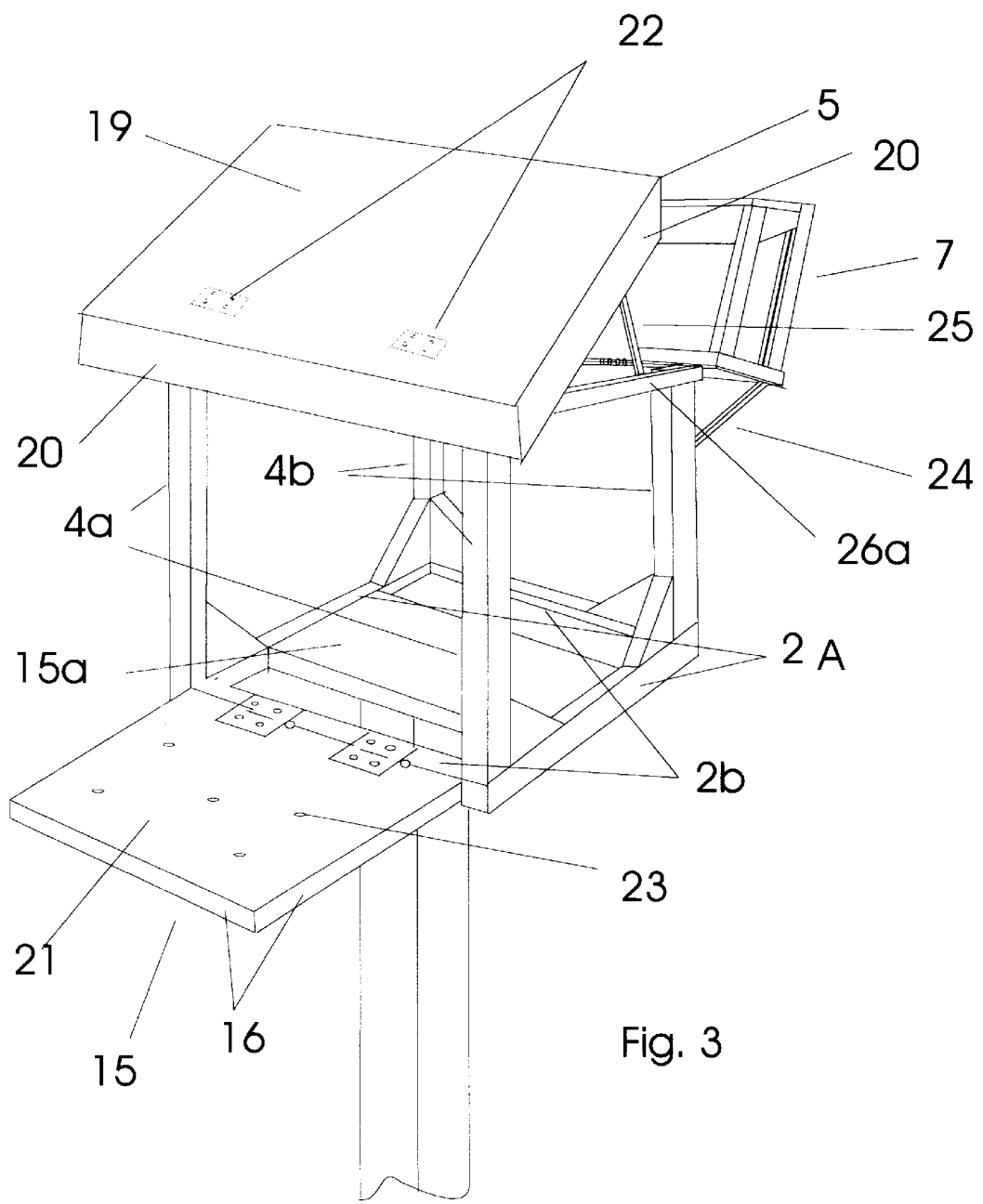
FIG. 3 is the perspective view of the bird feeder with the roof raised and the floor and autofeeder turned out upside down.

FIG. 3 shows the birdfeeder 1 with various rotatable parts in their open position. FIG. 3 shows the bird feeder 1 constructed in a truncated prism shape having a front side and a rear side shorter than the front side and includes the bottom base frame 2 structure that comprises a pair of parallel rectangular members 2a connected to two rectangular connecting members 2b at their ends to form the rectangular base frame 2. Attached to the base frame 2 are two pairs of vertical support members 4a and 4b mounted at each corner. The vertical support members 4a positioned at the front of the bird feeder 1 are longer than the vertical support members 4b at the rear side of the bird feeder 1 thereby providing the truncated prism shape. Vertical support members 4a and 4b support the top frame 26, which is connected to the rising members 4a and 4b. Top frame 26 comprises rectangular side members 26a, which are mounted on the outside surface of vertical support members 4a and 4b respectively on each side of bird feeder 1. The side members 26a are positioned flush with the tops of members 4a and 4b, which are cut at the appropriate angle to receive said side members 26a in a flush relationship. The side members 26a are also made flush to the front sides of members 4a and the rear sides of members 4b respectively at the top of said support members 4a and 4b. Front and rear rectangular side members of top frame 26 which are mounted perpendicular to side members 26a-are mounted on the outside surface of the vertical support members 4a and 4b respectively at the front and rear of the bird feeder.

The floor 15 is a rectangular shaped solid base member 21 with raised edges 16 on all four sides to hold the birdseed in the floor 15. A floor support 15a which may be part of the base of the feeder or simply a cross member along the bottom of the base frame 2 securely retains the floor 15 in a horizontal plane when the floor is rotated back into position inside the feeder 1. The floor 15 is also includes two hinges 18 to enable the floor 15 to be upraised out of the bird feeder 1 to the outside for easy cleaning. The floor 15 also contains several ⅛" holes for drainage.

The roof 5 consists of a rectangular shaped solid planar member 19 with raised edges 20 on all four sides. The roof 5 contains two hinges 22 for permitting rotation of the roof from the rear of the feeder to a position in front of the feeder refilling of the autofeeder 7. The hinges 22 are attached to the front of the top frame 26 of the bird feeder. The roof 15 is held in the upraised position by a support member 25 extended from the top frame 26 to the roof 5 which may be rotatably attached at one end or the other to either the roof 15 or the top frame 26 of the feeder.

Figure 4:
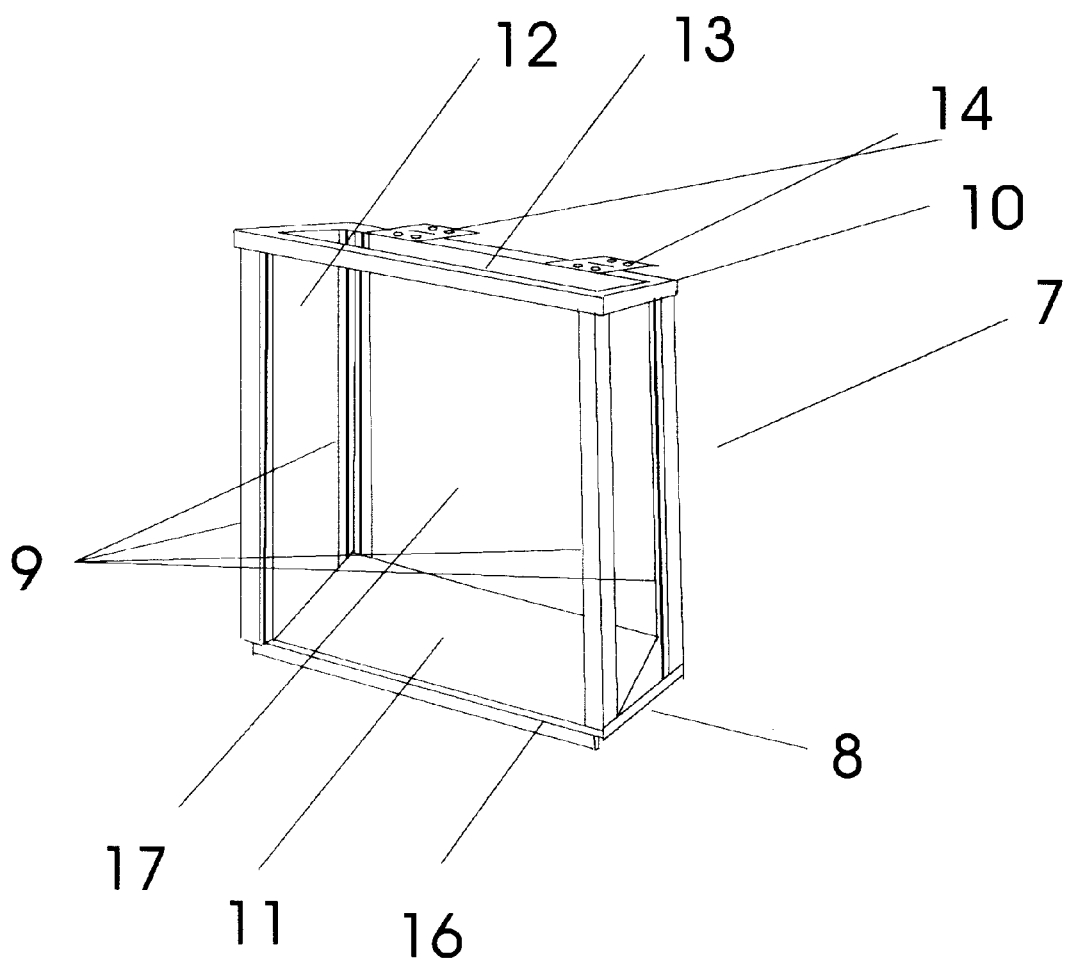
FIG. 4 is a perspective view of the autofeeder apart from the feeder.

As shown in FIG. 4, the truncated prism shaped autofeeder mounted to one side of said frame. The autofeeder 7 is also made in a truncated prism shaped comprising a rectangular base 8 with four rising members 9 connected to a rectangular top frame 10 which connects to the supporting members. A slanted floor 11 is mounted at the base to permit the gravity flow of birdseed. All four sides of the autofeeder 7 are enclosed by transparent plastic or Plexiglas or glass windows 12. These windows allow the birds to see the birdseed. The large visible birdseed display autofeeder creates a greater attraction for birds than simply distributing seed on the floor of the typical feeder. The autofeeder 7 is open at the top 13 to enable easy refilling. The autofeeder 7 contains two hinges 14 that enable the autofeeder 7 to be turned out of the bird feeder 1 for easy cleaning of the Plexiglas or glass windows 12 or emptying or changing birdseed. The hinges 14 are attached to the rear of the top frame 26 of the bird feeder. The autofeeder is held open for cleaning with the support member 24 extending from a rising support member 4 to the autofeeder 7 which may be rotatably attached at one end or the other to the autofeeder 7 or the support member 4. Appropriate stops may be introduced to prevent slippage of the support member 24, The front bottom edge 16 of the window 17 is raised from the floor 11 approximately ⅜" to form a slot, which enables the free, flow of birdseed from the autofeeder 7 to the floor 15. Different sized slots may be used dependent upon the type of feed used.

The autofeeder is rotatably and removably attached to said frame by hinges 14 and can be rotated outwards away from said frame for easy emptying of the contents thereof and removal and cleaning of the transparent sides 17. The moveable floor 15 can be rotated outwards and upside down for easy emptying and cleaning.

The present invention may, of course, be carried out in such other specific ways as those skilled in the art will determine based on this disclosure other than those herein set forth without departing from the spirit and essential characteristics of the invention. The description of the present embodiment is; therefore, to be considered in all respects as illustrative and not restrictive and all changes coming within the meaning and equivalency of the appended claims are intended to be embraced therein.

Having thus described the invention what is claimed is:

1. A fly through bird feeder comprising:
 (a) A base frame,
 (b) A plurality of supporting members,
 (c) A cover covering the top of said base frame supported by said base frame,
 (d) A floor covering at least part of said base frame rotatably attached to said base frame,
 (e) An autofeeder rotatably mounted to said supporting members.

2. A fly through bird feeder as described in claim 1 further comprising:
 a. a top frame attached to said supporting members; and
 b. the autofeeder rotatably mounted to said support members, for holding a supply of birdseed, said autofeeder having transparent sides enclosing said autofeeder and a slot disposed at one end thereof adjacent to a slanted bottom to permits said bird seed to exit said feeder through said slot and deposit on said floor for feeding.

3. A feeder comprising:
 a. a first base frame;
 b. a plurality of first supporting members attached to said base frame;
 c. a first top frame attached to said supporting members;
 d. a cover rotatably attached to said top frame;
 e. a first floor rotatably attached to said base frame; and
 f. an autofeeder for distributing feed rotatably attached to said top frame.

4. A feeder as described in claim 3 wherein said autofeeder further comprises:
 a. a second base frame smaller than said first base frame;
 b. a plurality of second supporting members attached to said second base frame;
 c. a second top frame attached to said second supporting members;
 d. a second floor attached to said second base frame and to said second supporting members, slanted towards the first floor of said feeder; and
 e. a plurality of removable sides mounted to said second support members, said floor and said sides forming an enclosed region, at least one of said sides having an opening at the bottom thereof for permitting feed deposited in said enclosed region to exit from said slanted second floor of said autofeeder on to said first floor of said feeder for facilitating feeding.

5. A feeder as described in claim 4 wherein said sides are transparent.

6. A feeder as described in claim 5 wherein said sides are transparent and removable.

7. A feeder as described in claim 4 wherein said sides are glass.

8. A feeder as described in claim 4 wherein said sides are plastic.

9. A feeder as described in claim 4 wherein said sides are made from Ultra Violet resistant plastic.

10. A fly through bird feeder comprising:

a. a base frame;

b. a plurality of supporting members;

c. a cover covering the top of said base frame supported by said supporting members; and d. a floor rotatably attached to said base frame;

e. a top frame attached to said supporting members; and f. an autofeeder rotatably mounted to said support members, for holding a supply of birdseed, said autofeeder having removable transparent sides enclosing said autofeeder and a slot disposed at one end thereof adjacent to a slanted bottom to permits said bird seed to exit said feeder through said slot and deposit on said floor for feeding.

11. A feeder comprising:

a. a first base frame;

b. a plurality of first supporting members attached to said base frame;

c. a first top frame attached to said supporting members;

d. a cover rotatably attached to said top frame;

e. a first floor rotatably attached to said base frame;

f. an autofeeder for distributing feed rotatably attached to said top frame having a second floor slanted towards the first floor of said feeder; and a plurality of removable sides said floor and said sides forming an enclosed region, at least one of said sides having an opening at the bottom thereof for permitting feed deposited in said enclosed region to exit from said slanted second floor of said autofeeder onto said first floor of said feeder for facilitating feeding.

12. A feeder as described in claim 11 wherein said sides are transparent.

13. A feeder as described in claim 12 wherein said sides are glass.

14. A feeder as described in claim 12 wherein said sides are plastic.

15. A feeder as described in claim 12 wherein said sides are made from Ultra Violet resistant plastic.

* * * * *